US012620629B2

(12) United States Patent
Ohta et al.

(10) Patent No.: US 12,620,629 B2
(45) Date of Patent: May 5, 2026

(54) BATTERY CELL AND MANUFACTURING METHOD OF THE SAME

(71) Applicant: HONDA MOTOR CO., LTD., Tokyo (JP)

(72) Inventors: Masahiro Ohta, Saitama (JP); Kosei Miyata, Saitama (JP); Yohei Noji, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 625 days.

(21) Appl. No.: 17/676,246

(22) Filed: Feb. 21, 2022

(65) Prior Publication Data

US 2022/0320589 A1      Oct. 6, 2022

(30) Foreign Application Priority Data

Mar. 30, 2021      (JP) ................................. 2021-056433

(51) Int. Cl.
H01M 10/0585      (2010.01)
H01M 10/04      (2006.01)

(52) U.S. Cl.
CPC ... H01M 10/0585 (2013.01); H01M 10/0468 (2013.01)

(58) Field of Classification Search
CPC ......... H01M 10/0585; H01M 10/0468; H01M 10/0525; H01M 10/0562; H01M 10/058; H01M 10/04
See application file for complete search history.

(56) References Cited

U.S. PATENT DOCUMENTS

| | | | | |
|---|---|---|---|---|
| 2009/0197158 A1* | 8/2009 | Ogawa | ................ | H01M 50/426 |
| | | | | 429/144 |
| 2012/0107678 A1* | 5/2012 | Kim | ..................... | H01M 10/02 |
| | | | | 429/186 |
| 2017/0054127 A1* | 2/2017 | Kim | .................... | H01M 50/463 |

(Continued)

FOREIGN PATENT DOCUMENTS

| | | |
|---|---|---|
| CN | 107331801 A | 11/2017 |
| CN | 107978801 A | 5/2018 |
| JP | 2000311717 A | 11/2000 |

(Continued)

OTHER PUBLICATIONS

English Translation of JP 2008251583A—Electricity storage device; Fuji Heavy Ind LTD; Oct. 16, 2008 (Year: 2008).*

(Continued)

*Primary Examiner* — Adam J Francis
(74) *Attorney, Agent, or Firm* — CKC & Partners Co., LLC

(57) ABSTRACT

A battery cell capable of holding an electrode laminate uniformly and improving lamination dislocation as well as the durability of an electrode is provided. A battery cell includes an electrode laminate in which a positive electrode and a negative electrode are alternately laminated via an electrolyte layer. The battery cell includes a tube-shaped insulating member that holds the electrode laminate, and the insulating member is heat-shrinkable mainly in a direction parallel to the lamination direction of the electrode laminate. The insulating member preferably has a heat shrinkage percentage of to −5% to 5% in a direction in which the current collector tab of the electrode laminate extends.

5 Claims, 6 Drawing Sheets

(56)                   References Cited

U.S. PATENT DOCUMENTS

2017/0288181  A1     10/2017   Hwang et al.
2018/0115013  A1*     4/2018   Matsumoto ............. B32B 37/06

FOREIGN PATENT DOCUMENTS

JP         2000348773  A     12/2000
JP         2002264215  A      9/2002
JP         2008251583  A  *  10/2008
JP         2014093128  A      5/2014
JP         2018073502  A      5/2018
JP         2020017398  A      1/2020

OTHER PUBLICATIONS

English Translation of JP2008251583A—Electricity storing device;
Fuji Heavy Ind Ltd; Oct. 16, 2008 (Year: 2008).*
Notification of Reasons for Refusal issued Nov. 26, 2024 in the JP
Patent Application No. 2021-056433.
Packaging Materials and Practical Packaging Technology, Tang
Zhixiang et al., Chemical Industry Press, p. 391, Aug. 31, 1996.
Plastic Molding Process and Mold Design, Chen Yuanlong et al.,
Beijing University of Aeronautics and Astronautics Press, p. 21,
Jun. 30, 2010.
Office Action issued Jul. 31, 2024 in the CN Patent Application No.
202210171654.5.

* cited by examiner

BATTERY CELL AND MANUFACTURING METHOD OF THE SAME

This application is based on and claim the benefit of priority from Japanese Patent Application No. 2021-056433, filed on 30 Mar. 2021, the content of which is incorporated herein by reference.

BACKGROUND OF THE INVENTION

Field of the Invention

The present invention relates to a battery cell and a manufacturing method of the battery cell.

Related Art

A secondary battery such as a lithium-ion secondary battery has conventionally been in widespread use, as a secondary battery having a high energy density. A liquid secondary battery has a separator disposed between a positive electrode and a negative electrode and includes a cell structure filled with a liquid electrolyte (electrolytic solution). Furthermore, in the case of an all-solid-state battery where the electrolyte is a solid, the battery includes a cell structure in which a solid electrolyte is interposed between a positive electrode and a negative electrode. A secondary battery is constituted by a laminate formed by a plurality of the unit cells layered. These are all sealed and packaged using outer packages.

As a cell structure of a secondary battery having the above laminate, for example, in a nonaqueous electrolyte secondary battery including a layered electrode body formed by laminating a positive electrode, a separator, and a negative electrode, one in which the laminated structure of a layered electrode body can be maintained through winding a porous sheet holding a nonaqueous electrolyte around the outer periphery of a layered electrode body, has been known (for example, see Patent Document 1).

Patent Document 1: Japanese Unexamined Patent Application, Publication No. 2014-093128

SUMMARY OF THE INVENTION

With a secondary battery having the above-mentioned laminate, there is a problem in that lamination dislocation is caused between a positive electrode, a negative electrode, and a solid electrolyte. The technology disclosed by Patent Document 1 does not have enough force in holding a laminate. Therefore, there is a probability of lamination dislocation in winding a porous sheet around a laminate, in accommodating a laminate in an outer package, when an impact from the outside is applied or the like. Increasing the dimensional difference between a positive electrode and a negative electrode for preventing electrodeposition considering the possibility of lamination dislocation, lowers an energy density. In addition, when an attempt is made to hold a laminate by winding a sheet-shaped body around the laminate, a level difference arises at the winding end part. This results in stress distribution generated in the laminate as well as degradations of the initial performance find durability. There is also room for improvement with respect to the durability of the electrode itself.

In order to address the above-mentioned problems, one possible way of suppressing lamination dislocation through holding the laminate is to insert a laminate into a tube-shaped heat shrinkable film and shrink the heat shrinkable film by heating. However, simply heating a heat shrinkable film in which a laminate is accommodated may lead to the ununiformed distance between electrodes or deformed electrodes due to a stress applied to the laminate surface of a laminate. To prevent the above event, for example, when only the laminate surface in a heat shrinkable film is shrunk by heating, the unheated surface of a heat shrinkable film being shrunk due to temperature rises in using a secondary battery or natural shrinkage may lead to the ununiformed distance between electrodes or deformed electrodes.

The present Invention has been made in view of the above-mentioned problems. Additionally/the present invention has an object to provide a battery cell capable of holding an electrode laminate uniformly and improving lamination dislocation as well as the durability of an electrode.

(1) The present invention relates to a battery cell including: an electrode laminate including positive and negative electrodes and an electrolyte layer/the positive and negative electrodes being alternately laminated with the electrolyte layer interposed between them; and a tube-shaped insulating member that holds the electrode laminate, wherein the insulating member is heat-shrinkable mainly in a direction parallel to the lamination direction of the electrode laminate.

(2) The battery cell described in (1), wherein the insulating member has a heat shrinkage percentage of −5% to 5% in a direction in which a current collector tab of the electrode laminate extends.

(3) The battery cell described in (1) or (2), wherein the insulating member has a heat shrinkage percentage of 5% to 80% in the lamination direction.

(4) The battery cell described in any one of descriptions (1) to (3), wherein when heat-shrunk in the main direction, the insulating member has a thickness tv on an electrode surface side of the electrode laminate and has a thickness th on a laminate surface side of the electrode laminate, and the insulating member satisfies the relationship represented by formula (1):

$$5\% < |(tv-th)/tv| \le 150\% \qquad \text{formula (1)}$$

(5) The battery cell described in any one of descriptions (1) to (4), wherein the insulating member has a weld part on the laminate surface side of the electrode laminate, and wherein the extending length of the weld part is 1.2 to 3 times the thickness of the insulating member.

(6) The battery cell described in any one of descriptions (1) to (5), wherein the height of the internal space of the insulating member is the same as the laminate height of the electrode laminate when the insulating member is heat shrunk in the main direction, and wherein the cross-sectional area of the internal space of the insulating member is 1.0 to 1.2 times the cross-sectional area of the electrode laminate.

(7) The battery cell described in any one of descriptions (1) to (6), wherein the electrode laminate includes a pressure equalizing member between the electrode laminate and the insulating member.

(8) The battery cell described in any of one of descriptions (1) to (7), wherein the length in the extending direction of a current collector tab of the insulating member is 0.98 to 1.2 times the length in the extending direction of a current collector tab of the electrode laminate.

(9) The battery cell described in any one of descriptions (1) to (8), wherein the opening area of the insulating member is smaller than the end surface area of the electrode laminate.

(10) In addition, the present invention relates to a manufacturing method of a battery cell having an electrode laminate in which a positive electrode, an electrolyte layer, and a negative electrode are alternately laminated, the manufacturing method including: arranging the electrode laminate into the internal space of a tube-shaped, heat-shrinkable insulating member such that the insulating member is heat-shrinkable mainly in a direction parallel to the lamination direction of the electrode laminate; and heat-shrinking a surface of the insulating member disposed on the laminate surface side of the electrode laminate by heating.

(11) The manufacturing method of a battery cell described in (10), wherein the insulating member whose main shrinkage direction of the heat shrinkage is the lamination direction of the electrode laminate is formed by previously heating then heat shrinking the surface disposed on the electrode surface side of the electrode laminate of the insulating member.

(12) The manufacturing method of a battery cell described in (10) or (11), wherein the heating temperature in the heating is 60° C. or higher.

(13) The manufacturing method of a battery cell described in (11), wherein at least any one of heating temperature in the heating and heating temperature for previously heating the surface disposed on the laminate surface side of the electrode laminate of the insulating member is 60° C. or higher.

(14) The manufacturing method of a battery cell in any one of descriptions (10) to (13), further including a drawing portion forming step including forming a drawing portion after heating both end parts in the extending direction of the current collector tab of the electrode laminate of the insulating member.

(15) The manufacturing method of a battery ceil described in (14), wherein the drawing portion forming step includes a first drawing portion forming step including heating one end part in the extending direction of the current collector tab of the electrode laminate of the insulating member, and a second drawing portion forming step including heating the other end part in the extending direction of the current collector tab of the electrode laminate of the insulating member, and wherein the arranging step is carried out between the first drawing portion forming step and the second drawing portion forming step.

The present invention provides a battery cell capable of holding an electrode laminate uniformly and improving lamination dislocation as well as the durability of an electrode.

DETAILED DESCRIPTION OF THE INVENTION

Although specific embodiments of the present invention are hereinafter described in detail, the present invention is not limited to the following embodiments and can be implemented within the scope of the purpose of the present invention by making appropriate changes.

First Embodiment

Battery Cell

Figure 1:
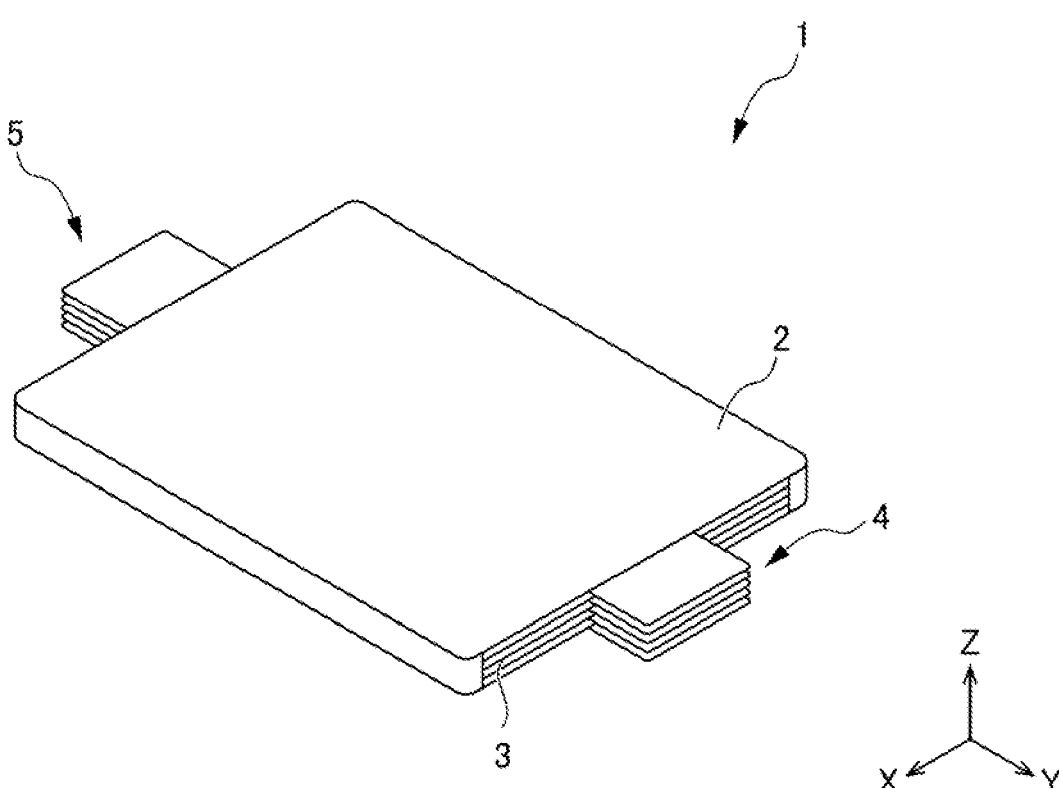
FIG. 1 shows a perspective view illustrating an outline of a battery cell according to an embodiment of the present invention.

FIG. 1 shows a perspective view illustrating an outline of a battery cell 1 according to an embodiment of the present invention. The battery cell 1 according to this embodiment includes an electrode laminate 3, an insulating member 2 surrounding and holding the electrode laminate 3, and a positive electrode current collector tab 4 and a negative electrode current collector tab 5 extending from both end parts of the electrode laminate 3. The battery cell 1 is, for example, a solid-state battery cell Including a solid electrolyte as an electrolyte, however, a configuration of the present invention, is also applicable to a liquid secondary battery including a liquid electrolyte as an electrolyte. The battery cell 1 is accommodated in any outer package (not shown) formed by a laminate film or the like. In the following explanations and drawings, X direction denotes a direction along an electrode surface included in the electrode laminate 3 (hereinafter, may be described as an "electrode surface direction"); Y direction denotes an extending direction of the above current collector tab (hereinafter, may be described as an "extending direction of a current collector tab"); and Z direction denotes a direction along a laminate surface of the electrode laminate 3 (hereinafter, may be described as a "lamination direction").

Electrode Laminate

Figure 2:
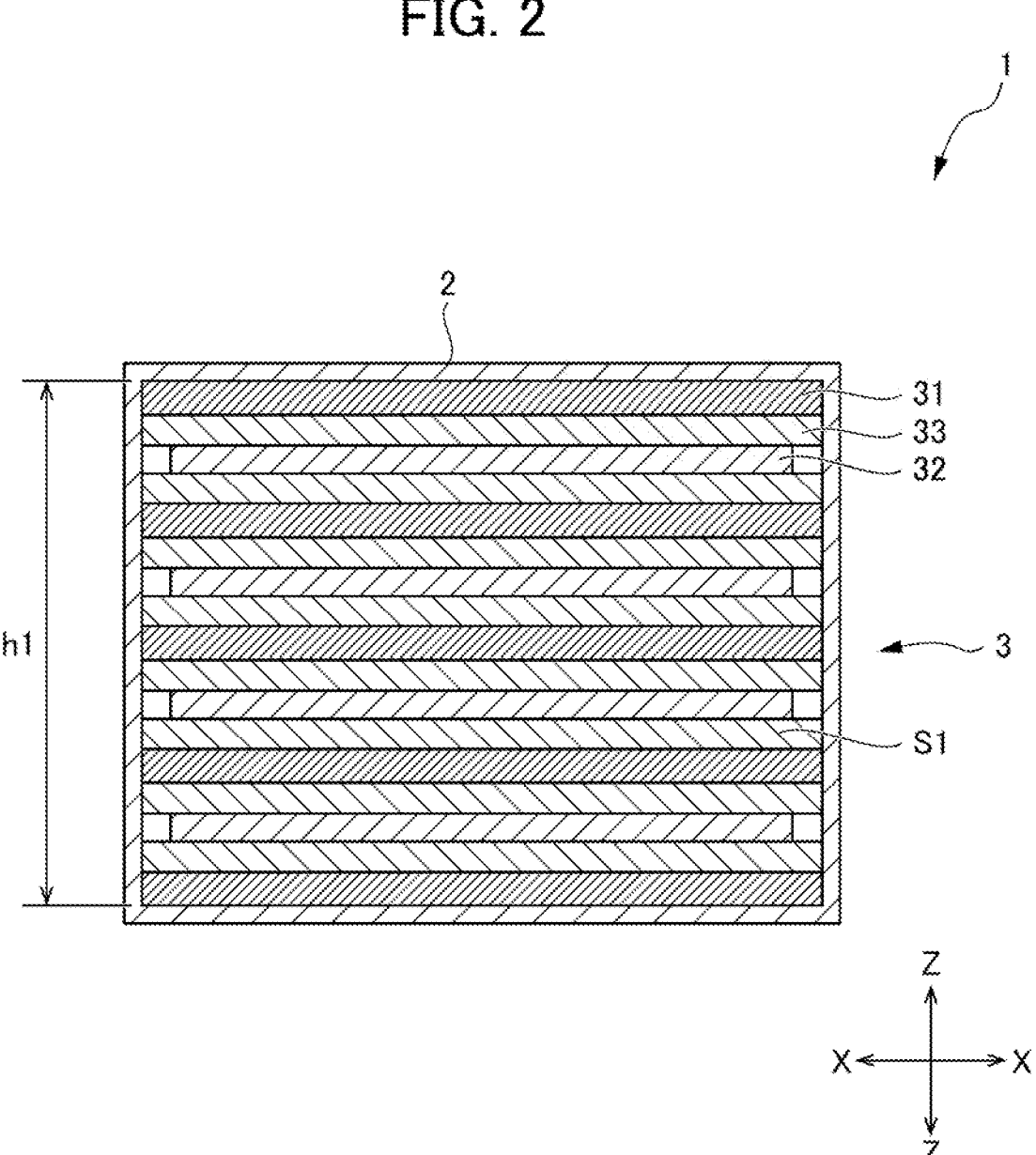
FIG. 2 shows a cross-sectional view of an outline of a battery cell according to a first embodiment of the present invention.

FIG. 2 shows a cross-sectional view in the Y direction illustrating the outline of the electrode laminate 3. As shown in FIG. 2, the electrode laminate 3 is formed by alternately laminating a plurality of negative and positive electrodes 31, 32 and by laminating a solid electrolyte layer 33 between the negative electrode 31 and the positive electrode 32. In this embodiment, the electrode laminate 3 has an approximately rectangular parallelepiped shape as a whole. The cross-sectional height in the Y direction represents an h1 while the cross-sectional area in the V direction represents an S1.

Negative Electrode

The negative electrode 31 is not particularly limited, and a known negative electrode used as a negative electrode for a solid-state battery can be applied. The negative electrode 31, for example, is formed by a sheet-shaped negative electrode current collector and a sheet-shaped negative electrode active material layer.

The negative electrode current collector is not particularly limited, and for example, a metal foil of a stainless (Steel Use Stainless (SUS)) foil, a copper (Cu) foil or the like, may be used. The negative electrode current collectors of a plurality of negative electrodes 31 are electrically connected to the negative electrode current collector tab 5. The negative electrode current collector tab 5 may be integrally formed with the negative electrode current collector, may be a member different from the negative electrode current collector, and may be electrically connected to the negative electrode current collector by welding or the like.

A material composing a negative electrode active material layer is not particularly limited, k known material can be applied for a negative electrode active material of a solid-state battery, k composition of a negative electrode active material layer is also not particularly limited and may contain a solid electrolyte, a conductive assistant, a binding agent or the like besides a negative electrode active material.

If the battery cell 1, for example, is a lithium ion solid-state battery cell, a negative electrode active material is not particularly limited as long as the negative electrode active material can occlude and release lithium ions. For example, as a negative electrode active material, a metal lithium, a lithium alloy, a metal oxide, a metal sulfide, a metal nitride, silicon (Si), silicon oxide (SiO), and a carbon material such as graphite, hard carbon, or soft carbon, or the like are given.

Positive Electrode

The positive electrode 32 is not particularly limited, and a known positive electrode used as a positive electrode of a solid-state battery can be applied. The positive electrode 32, for example, is formed by a sheet-shaped positive electrode current collector and a sheet-shaped positive electrode active material layer.

The positive electrode current collector is not particularly limited and for example, a metal foil of a stainless (SUS) foil, an aluminum (Al) foil or the like, may be used. The positive electrode current collectors of a plurality of positive electrodes 32 are electrically connected to the positive electrode current collector tab 4. The positive electrode current collector tab 4 may be integrally formed with the positive electrode current collector, may be a member different from the positive electrode current collector, and may be electrically connected to the positive electrode current collector by welding or the like.

A material composing a positive electrode active material layer is not particularly limited. A known material can be applied for a positive electrode active material of a solid-state battery. A composition of a positive electrode active material layer is also not particularly limited and may contain a solid electrolyte, a conductive assistant, a binding agent or the like besides a positive electrode active material.

A positive electrode active material is not particularly limited. If the battery ceil 1, for example, is a lithium ion solid-state battery cell, as a positive electrode active material, for example.

transition metal chalcogenide of titanium disulfide, molybdenum disulfide, niobium selenide or the like, a transition metal oxide or the like such as a lithium nickelate (LiNiO$_2$), a lithium manganese oxide (LiMnO$_2$, LiMn$_2$O$_4$), a lithium cobalt oxide (LiCoO$_2$) or the like, or the like are given.

Solid Electrolyte Layer

The solid electrolyte layer 33 is laminated between the negative electrode 31 and the positive electrode 32 and, for example, is formed into a layer shape. The solid electrolyte layer 33 is a layer containing at least a solid electrolyte material. Through the above solid electrolyte material, the movement of ions between a positive electrode active material and a negative electrode active material, is made possible.

A solid electrolyte material is not particularly limited, however, for example, a sulfide solid electrolyte material, an oxide solid electrolyte material, a nitride solid electrolyte material, a halide solid electrolyte material or the like, are given.

Insulating Member

As shown in FIGS. 2 to 5, the insulating member 2 is a tube-shaped insulating member having an internal space capable of accommodating the electrode laminate 3. The insulating member 2 is a member having heat shrink properties that shrinks when heated and, for example, is composed of a heat shrinkable film. By using a tube-shaped insulating member having heat shrink properties as the insulating member 2, the battery cell 1 can be configured so that there are no level differences on the electrode surface of the electrode laminate 3, in comparison with a case where a sheet-shaped insulating member is wound around the electrode laminate 3. Consequently, a cracking of an electrode or a solid electrolyte can be prevented.

For a heat shrinkable film, for example, a polyethylene terephthalate shrinkable film, a polystyrene shrinkable film, a polyolefin shrinkable film, a polyvinyl chloride shrinkable film, a polycarbonate shrinkable film, a polyethylene shrinkable film, a polypropylene shrinkable film or the like, may be used. One type or a combination of two or more types of the above heat shrinkable film may be used.

Figure 3:
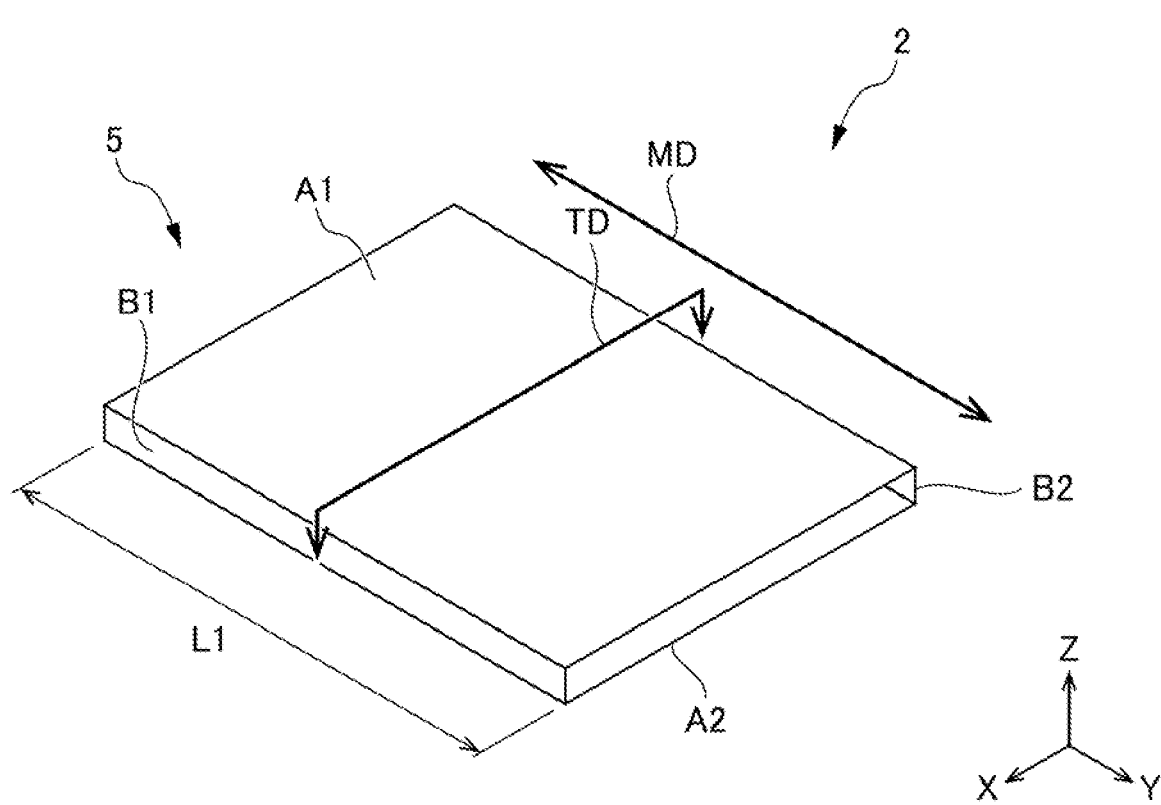
FIG. 3 is a perspective view illustrating an outline of an insulating member according to a first embodiment of the present invention.
Figure 4:
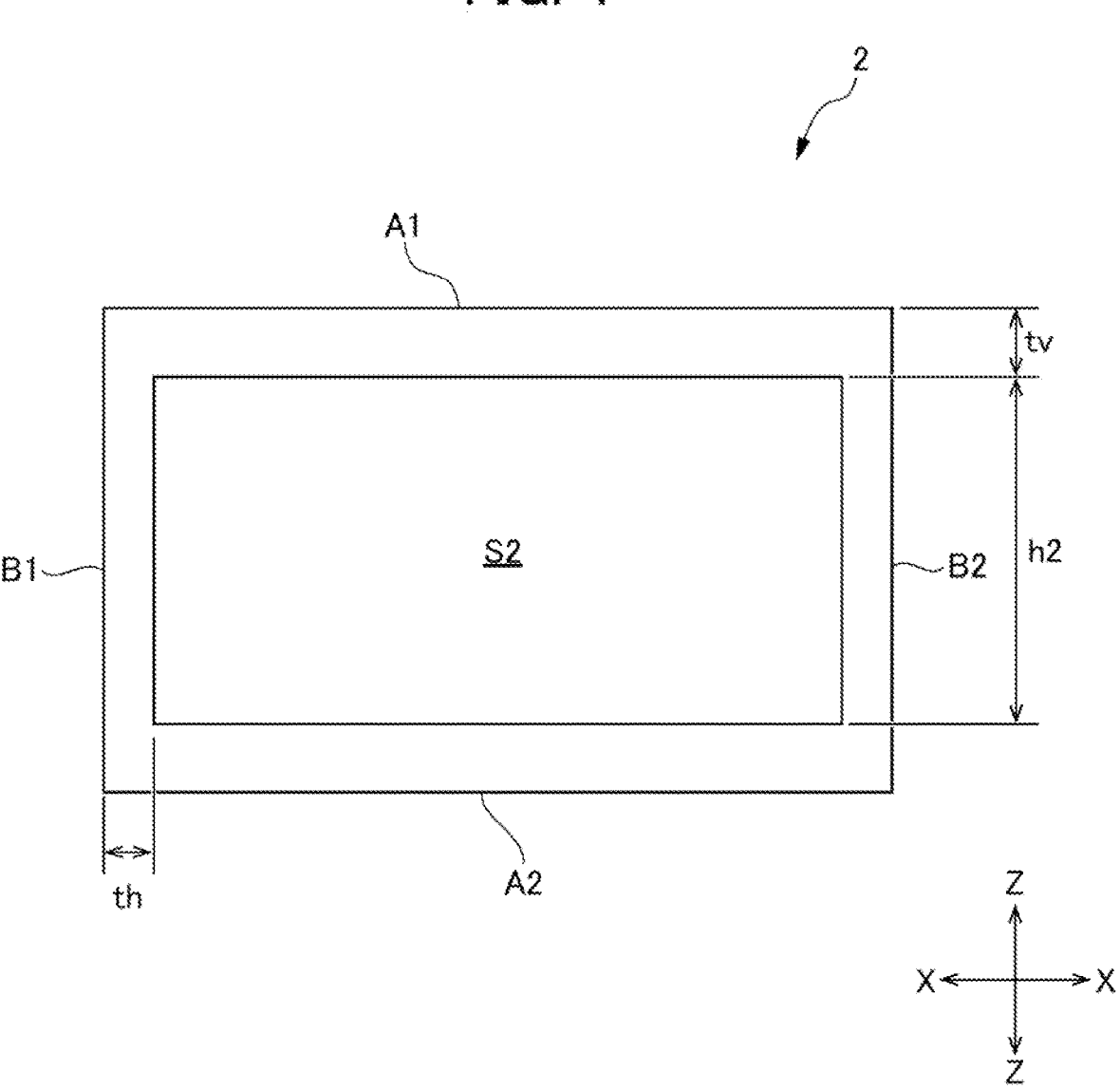
FIG. 4 is a side view illustrating a configuration of an insulating member according to a first embodiment of the present invention.

As shown in FIGS. 3 and 4, the insulating member 2 is a tube-shaped member having an internal space in which the electrode laminate 3 can be arranged. The insulating member 2 includes surfaces A1, A2 disposed on the electrode surface sides of the electrode laminate 3 and surfaces B1, B2 disposed on the laminate surface sides of the electrode laminate 3, with both end parts in the extending direction of the current collector tab in an opened state. The insulating member 2 has a seamless shape free from level differences in this embodiment, however, may be composed by welding the end parts of one heat shrinkable film to each other (details of this will be discussed later in the second embodiment).

The insulating member 2 has main shrinkage direction of the heat shrinkage being in the lamination direction of the electrode laminate 3. In this specification, "main shrinkage direction" indicates a direction where the heat shrinkage rate due to a heat shrinkage is higher than other directions when the electrode laminate 3 is arranged in the internal space of the insulating member 2 and the insulating member 2 is heat shrunk by heating to hold the electrode laminate 3. In this embodiment, the above configuration of the insulating member 2, is synonymous with the fact that the surfaces B1, B2 of the insulating member 2 disposed on the laminate surface side of the electrode laminate 3 have a higher heat shrinkage rate due to a heat shrinkage than the surfaces A1, A2 of the insulating member 2 disposed on the electrode surface side of the electrode laminate 3. Through the insulating member 2 having the above configuration, the surfaces B1, B2 are mainly heat shrunk by heating after the electrode laminate 3 is arranged in the internal space of the insulating member 2. This prevents an excessive stress from being applied on the laminate surface of the electrode laminate 3. As a result, the ununiformed distance between electrodes or deformed electrodes can be prevented. Note that a heat shrinkage rate is obtained as a ratio (percentage) of the difference between the length before shrinkage and the length after shrinkage with respect to the length before shrinkage.

The above configuration in which the main shrinkage direction of the insulating member 2 is in the lamination direction of the electrode laminate 3 can be realized, for example, by having the surfaces A1, A2, in the direction of the electrode surfaces of the insulating member 2, which are heat shrunk by heating in advance. This allows the heat shrinkage of the insulating member 2 to be suppressed, even when heating is applied from the outside after arranging the electrode laminate 3 in the internal space of the insulating member 2 and heat-shrinking the surfaces B1, B2 of the insulating member 2 by heating to constitute the battery cell 1. Thus, the ununiformed distance between electrodes or deformed electrodes can be prevented after the battery cell 1 is constituted. In addition to the above, the surfaces A1, A2 may be composed of a material having a smaller heat shrinkage, whereas the surfaces B1, B2 may be composed of a material having a larger heat shrinkage. The insulating member 2 whose main shrinkage direction is the lamination direction of the electrode laminate 3 may be configured.

It is preferable that the heat shrinkage rate in an extending direction of a current collector tab of the insulating member 2 is –5% to 5%. A beat shrinkable film composing the insulating member 2 has an anisotropy. As shown in FIG. 3, if the film is shrunk in the TD direction which is the circumferential direction of the insulating member 2, then a holding force to the electrode laminate 3 is generated. On the other hand, when expansion or shrinkage generates with respect to the MD direction which is in an extending direction of a current collector tab of the insulating member 2, a stress acts in the direction in which the electrode and the electrolyte layer constituting the electrode laminate 3 are displaced. Therefore, it is preferable that the insulating member 2 has a heat shrinkage rate in the HD direction close to 0%. If the heat shrinkage rate of the insulating member 2 in the MD direction exceeds 5%, the above stress may exceed the static friction force and eventually cause lamination dislocation. When the heat shrinkage rate of the insulating member 2 in the MD direction is less than –5%, an increase in the volume of the insulating member 2 in addition to lamination dislocation may lead to a decrease in the energy density of the battery cell 1.

It is preferable that the heat shrinkage rate in the TD direction of the insulating member 2 shown in FIG. 3 is 5% to 80%. If the heat shrinkage rate in the TD direction of the insulating member 2 is less than 5%, the holding force to electrode laminate 3 due to heat shrinkage of the insulating member 2 becomes insufficient, leading to the possibility of lamination dislocation of the electrode. When the heat shrinkage rate of the insulating member 2 in the TD direction exceeds 80%, an excessive holding force is generated on the electrode laminate 3, and deformation of the electrode laminate 3, lamination dislocation of the electrodes, deformation of the electrodes or the like may occur.

In the case when surfaces B1, B2 which are the main shrinkage direction of the insulating member 2, are heat shrunk, it is preferable that the following Expression (1) is met, where the thicknesses of surfaces A1, A2 disposed on the electrode surface side of the electrode laminate 3 shown in FIG. 4 are tv; and the thicknesses of surfaces B1, B2 disposed on the laminate surface side of the electrode laminate 3 are th. Expression (1)

$$5\% < |(tv - th)/tv| \leq 150\%$$

In the above Expression (1), if $|(tv - th)/tv|$ is less than 5%, deformation of the electrode laminate 3, lamination dislocation of the electrodes, deformation of the electrodes or the like may occur. In the above Expression (1), if $|(tv - th)/tv|$ exceeds 150%, since the amount of heat shrinkage is too large, dimensional accuracy is lowered. This also creates creases easily on the insulating member 2.

In the case of tv>th, it is preferable that the direction of previously heat shrinking the insulating member 2 is X direction. Since the temperature Tx at which the surfaces A1, A2 are heat shrunk is higher than the temperature Tz at which the surfaces B1, B2 are heat shrunk (Tx>Tz), a uniform holding force can be applied to the electrode laminate 3. In the case of tv<th, the temperature Tx at which the surfaces A1, A2 are heat shrunk is smaller than the temperature Tz at which the surfaces B1, B2 are heat shrunk (Tx<Tz), a uniform holding force can be applied to the electrode laminate 3. Further, Tx and Tz which are the heat shrinkage temperature of the insulating member 2 are preferably 60° C. or higher. When the battery cell 1 is a lithium ion secondary battery, the upper limit of a use temperature of a lithium ion secondary battery is about 60° C. Therefore, heat-shrinking the insulating member 2 at 60° C. or higher prevents the insulating member 2 from being heat shrunk during which the battery cell 1 is in use. In other words, deformation of the electrode laminate 3, lamination dislocation of the electrodes, deformation of the electrodes or the like during the use of the battery cell 1, can be prevented.

In the case when surfaces B1, B2 which are the main shrinkage direction of the insulating member 2, are heat shrunk, an internal space height h2 of the insulating member 2 is preferably the same as a laminate height h1 of the electrode laminate 3. This enables the insulating member 2 to exhibit its holding force to the electrode laminate 3. Furthermore, a cross-sectional area S2 of the internal space of the insulating member 2 is preferably 1.0 to 1.2 times the cross-sectional area S1 of the electrode laminate 3. Thereby, a lowered energy density of the battery cell 1 or deformation of the electrode laminate 3 can be prevented. Note that when the size of the electrodes constituting the electrode laminate 3 is different depending on the type, the cross-sectional area S1 of the electrode laminate 3 means the cross-sectional area in a rectangular region including each electrode.

It is preferable that the compressive stress due to the heat shrinkage of the insulating member 2 is larger than the weakest static friction force between the electrode and the electrolyte layer constituting the electrode laminate 3. This allows the insulating member 2 to apply a uniform holding force to the electrode laminate 3. If the above compressive stress does not satisfy the above mentions, a portion where there is an insufficient static friction force in the electrode laminate 3, is generated. As a result, an external force such as vibration and collision during the use of the battery cell 1 may cause lamination dislocation of the electrode in the electrode laminate 3 from the point where the static friction force is the smallest as a starting point.

An extending direction length L1 of the current collector tab of the insulating member 2 is preferably 0.93 to 1.2 times the extending direction of the current collector tab of the electrode laminate 3. If the above extending direction length L1 of the current collector tab of the insulating member 2 is less than 0.98 times*, it is difficult to sufficiently secure the insulating performance of the electrode laminate 3 and the holding force of the electrode laminate 3 by the insulating member 2. If the above extending direction length L1 of the current collector tab of the insulating member 2 exceeds 1.2 times, since the volume of a portion not contributing to charging/discharging increases, the energy density of the battery cell 1 decreases.

Figure 5:
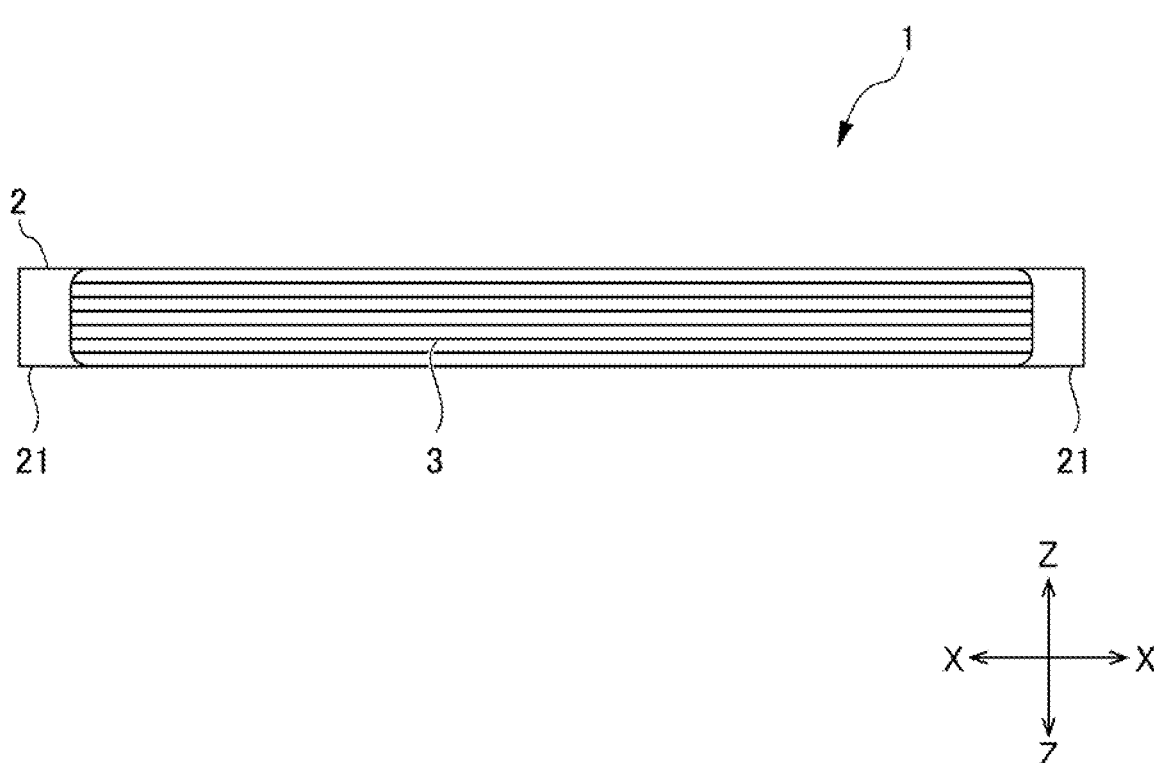
FIG. 5 is a side view illustrating a configuration of a battery cell according to a first embodiment of the present invention.

The opening area of the insulating member 2 is preferably smaller than the end surface area of the electrode laminate 3. As shown in FIG. 5, drawing portions 21 are formed at opened both end parts of the insulating member 2. This makes it possible to prevent the electrode laminate 3 from being displaced in the Y direction.

The battery cell 1 may have a configuration other than the above. For example, the electrode laminate 3 may include a pressure equalizing member between the electrode laminate 3 and the insulating member 2. This allows the thickness of the electrode laminate 3 to be made uniform, and thus the holding force on the electrode laminate 3 can be made uniform. For a pressure equalizing member, any material that can be deformed by stress, may be used.

As an example of the pressure equalizing member, for example, a resin material of polyimide, polycarbonate, polyacetal, polybutylene terephthalate, polyethylene terephthalate or the like, a metal material whose surface is insulated of aluminum whose surface is insulated, SUS or the like may be used. Using a material having a high rigidity and a high specific strength allows for reducing the thickness of a pressure equalizing member. Thereby, more preferably, as a pressure equalizing member, a metal material whose surface is insulated, is used.

Second Embodiment

Figure 6:
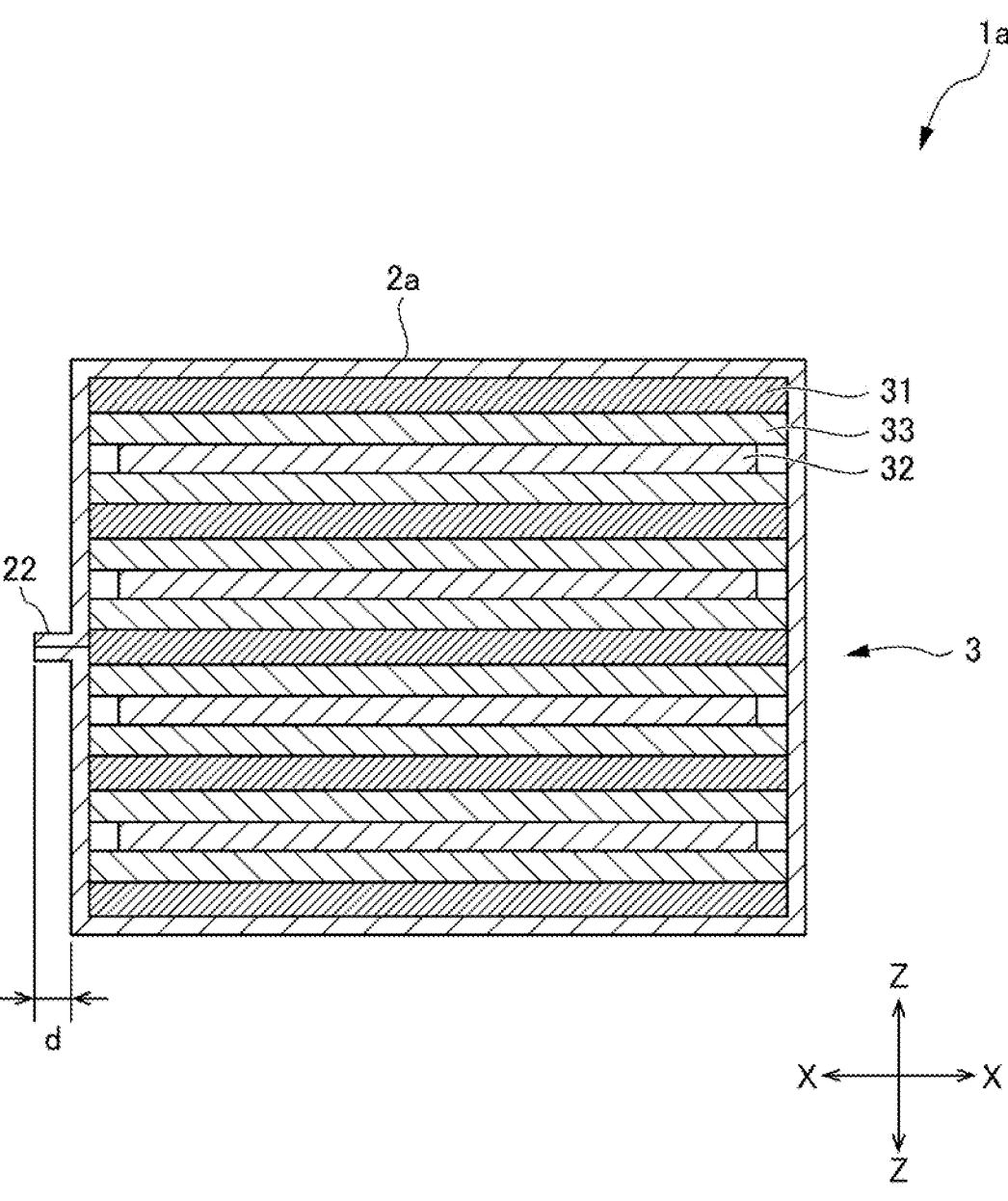
FIG. 6 is a cross-sectional view illustrating an outline of a battery cell according to a second embodiment of the present, invention.

Hereinafter, a battery cell 1a according to the second embodiment of the present invention, is described. The descriptions common to the first embodiment may be omitted. The battery cell 1a according to this embodiment includes an insulating member 2a having a weld part 22, as shown in FIG. 6.

The weld part 22 is a weld part formed when the end parts of sheet-shaped heat shrinkable films are welded to each other to obtain a tube-shaped insulating member 2a. The weld part 22, for example, is formed in such a way that the end parts of sheet-shaped heat shrinkable films are partially overlapped with each other and heated them to perform welding and fusing, with such a configuration of the insulating member 2a, a manufacturing method of winding a sheet-shaped heat shrinkable film around the electrode laminate 3 then welding and fusing the end parts of sheet-shaped heat shrinkable films to each other can be applied. Thus, the manufacturing process of the battery cell 1a is simplified. Note that the weld part 22 is arranged on the laminate surface side of the electrode laminate 3. As a result, no level differences arise on the electrode surface side on which the battery cell 1a is arranged, causing no problems of lamination dislocation of the electrode in the electrode laminate 3.

An extending length d of the weld part 22 is preferably 1.2 to 3 times the thickness of the insulating member 2a. If the above extending direction length d of the weld part 22 is less than 1.2 times, the portion near the weld part 22 of the insulating member 2a is heat shrunk due to the heating in forming the weld part 22. This leads to a problem that a holding force of the electrode laminate 3 to the lamination direction of the electrode laminate 3 does not become uniform. If the above extending direction length d of the weld part 22 exceeds 3 times, since the volume of a portion not contributing to charging/discharging increases, the energy density of the battery cell 1 decreases.

Manufacturing Method of Battery Cell

A manufacturing method of the battery cell according to this embodiment includes: an arranging process for arranging an electrode laminate into the internal space of a tube-shaped insulating member with heat shrink properties such that the main shrinkage direction of the heat shrinkage of the insulating member is the lamination direction of the electrode laminate; and a heating process for heat shrinking the surface disposed on the laminate surface side of the electrode laminate of the insulating member by heating. In addition, a manufacturing method of the battery cell according to this embodiment may include a drawing portion forming process for forming the drawing portion after heating both end parts in the extending direction of the current collector tab of the electrode laminate of the insulating member.

Arranging Process

An arranging process is a process for arranging an electrode laminate into the internal space of a tube-shaped insulating member with heat shrink properties. At this time, the electrode laminate is arranged so that the main shrinkage direction of the heat shrinkage of the insulating member is the lamination direction of the electrode laminate. Note that the above tube-shaped insulating member, for example, is formed by welding the end parts of sheet-shaped heat shrinkable films to each other. In such case, the arranging process and the formation of the tube-shaped insulating member may be performed at the same time by v/rapping the electrode laminate with a sheet-shaped heat shrinkable film and welding the end parts of sheet-shaped heat-shrinkable films to each other. An insulating member whose main shrinkage direction of the heat shrinkage of the insulating member is the lamination direction of the electrode laminate, for example, is formed by previously heating a part of the heat shrinkable film (a place arranged at the electrode surface side of the electrode laminate) to be heat shrunk, before or after the tube-shaped insulating member is formed by the heat shrinkable film. At this time, preferably, the temperature at which the heat shrinkable film is previously heated, is 60° C. or higher.

Heating Process

A heating process is a process for heat shrinking the surface disposed on the laminate surface side of the electrode laminate of the insulating member by heating. The heating process makes the insulating member to adhere to the electrode laminate, leading to the exertion of the holding force by the insulating member. Moreover, heat shrinking the surface disposed on the laminate surface side of the electrode laminate of the insulating member by heating, makes it possible to prevent an excessive stress from being applied on the laminate surface of the electrode laminate. As a result, the ununiformed distance between electrodes or deformed electrodes can be prevented. Preferably, the heating temperature in the heating process is 60° C. or higher.

Drawing Portion Forming Process

A drawing portion forming process is a process for forming a drawing portion by pressing a mold formed corresponding to the shape of the end part to an opening end part of the insulating member after the above heating process and heating it. Forming a drawing portion enables to prevent the electrode laminate from being displaced in the Y direction. The heating temperature in the drawing portion forming process may be a temperature higher than a heating temperature in the heating process.

The forming process for the drawing portion includes a first drawing portion forming process for heating one end part in the extending direction of the current collector tab of the electrode laminate of the insulating member, and a second drawing portion forming process for heating the other end part in the extending direction of the current collector tab of the electrode laminate of the insulating member. Additionally, it is preferable that the arranging process is carried out between the first drawing portion forming process and the second drawing portion forming process. This makes the positioning of a laminate using a drawing portion formed through the first drawing portion forming process easier.

Although the embodiments relating to the present invention have been described above, the present invention is not limited to the above embodiments and can be changed as needed.

The method for manufacturing a battery cell of the present, invention is not limited to the description of the above embodiments. An insulating member whose main shrinkage direction of the heat shrinkage of the insulating member is the lamination direction of the electrode laminate, for example, may be composed of a plurality of materials having different heat shrinkage rates. A tube-shaped seamless insulating member may be used to form a tube-shaped insulating member, instead of welding a sheet-shaped heat shrinkable film.

EXPLANATION OF REFERENCE NUMERALS 1A battery cell
2A insulating member
22 weld part
3 electrode laminate
31 negative electrode
32 positive electrode
33 solid electrolyte layer (electrolyte layer)

What is claimed is:

1. A manufacturing method of a battery cell having an electrode laminate in which a positive electrode and a negative electrode are alternately laminated via an electrolyte layer, the manufacturing method comprising:
    a first heating step of heating then heat shrinking a surface of an insulating member that is tube-shaped and heat-shrinkable, the surface being disposed on an electrode surface side of the electrode laminate;

arranging the electrode laminate into an internal space of the insulating member such that a heat shrinked surface is the electrode surface side of the electrode laminate; and
    after the arranging, a second heating step of heat-shrinking a surface of the insulating member disposed on a laminate surface side of the electrode laminate by heating.

2. The manufacturing method of a battery cell according to claim 1, wherein the heating temperature in the second heating step is 60° C. or higher.

3. The manufacturing method of a battery cell according to claim 1, wherein at least any one of heating temperature in the second heating step and the heating temperature for previously heating the surface disposed on the electrode surface side of the electrode laminate of the insulating member is 60° C. or higher.

4. The manufacturing method of a battery cell according to claim 1, further comprising a drawing portion forming step comprising forming a drawing portion after heating both end parts in the extending direction of the current collector tab of the electrode laminate of the insulating member.

5. The manufacturing method of a battery cell according to claim 4, wherein the drawing portion forming step comprises a first drawing portion forming step comprising heating one end part in the extending direction of the current collector tab of the electrode laminate of the insulating member, and a second drawing portion forming step comprising heating the other end part in the extending direction of the current collector tab of the electrode laminate of the insulating member, and wherein the arranging step is carried out between the first drawing portion forming step and the second drawing portion forming step.

* * * * *